United States Patent
Muramoto

(10) Patent No.: US 12,130,192 B2
(45) Date of Patent: Oct. 29, 2024

(54) PRESSURE SENSOR

(71) Applicant: Yazaki Corporation, Tokyo (JP)

(72) Inventor: Daichi Muramoto, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 237 days.

(21) Appl. No.: 17/894,664

(22) Filed: Aug. 24, 2022

(65) Prior Publication Data
US 2023/0064437 A1 Mar. 2, 2023

(30) Foreign Application Priority Data
Aug. 25, 2021 (JP) .................................. 2021-136912

(51) Int. Cl.
*G01L 19/14* (2006.01)
*G01L 9/04* (2006.01)
*G01L 19/00* (2006.01)

(52) U.S. Cl.
CPC ................ *G01L 19/14* (2013.01); *G01L 9/04* (2013.01); *G01L 19/0069* (2013.01)

(58) Field of Classification Search
CPC ....... G01L 19/14; G01L 9/04; G01L 19/0069; G01L 19/003; G01L 19/0654; G01L 19/142; G01L 19/144; G01L 19/0636
See application file for complete search history.

(56) References Cited

U.S. PATENT DOCUMENTS

| 5,692,637 A | 12/1997 | Hodge |
| 6,651,508 B2 | 11/2003 | Baba et al. |
| 2010/0018892 A1 | 1/2010 | Kohmura et al. |
| 2011/0041594 A1 | 2/2011 | Eslami et al. |
| 2021/0293647 A1* | 9/2021 | Mbaye .................. G01L 19/147 |

FOREIGN PATENT DOCUMENTS

JP 2001-296196 A 10/2001

* cited by examiner

*Primary Examiner* — Xin Y Zhong
(74) *Attorney, Agent, or Firm* — Sughrue Mion, PLLC

(57) ABSTRACT

Provided is a pressure sensor including: a housing portion including a housing part housing a pressure sensor module, a concave portion facing the housing part across an inner wall, and a through hole part formed in the inner wall; a filter covering the through hole part; and a cover mounted on the housing portion while covering the concave portion and including cutout parts. The concave portion includes a bottom surface that is one surface of the inner wall, and two side surfaces perpendicular to the bottom surface and opposed to each other. The cover is formed with a rectangular upper plate and two rectangular side plates continuous with edges of the upper plate in a vertical direction and opposed to each other. The upper plate is arranged to face the bottom surface. The two side plates are arranged between the two side surfaces opposed to each other.

4 Claims, 8 Drawing Sheets

PRESSURE SENSOR

CROSS REFERENCE TO RELATED APPLICATION

The present application is based on, and claims priority from the prior Japanese Patent Application No. 2021-136912, filed on Aug. 25, 2021, the entire contents of which are incorporated herein by reference.

TECHNICAL FIELD

The present disclosure relates to a pressure sensor.

BACKGROUND

In conventional gauge pressure type pressure sensors, which measure based on atmospheric pressure, one end of the pressure detector is open to the atmosphere. However, if the pressure detector is simply open to the atmosphere, there is a concern that a failure due to moisture or dust entering the sensor through the atmospheric opening hole or a decrease in detection accuracy due to clogging of the atmospheric opening hole may occur. Thus, Japanese Unexamined Patent Application Publication No. 2001-296196 discloses a technique related to a pressure sensor in which a filter for preventing the passing through of moisture, dust, and the like while allowing the flow of air is mounted on the atmospheric opening hole.

SUMMARY

In the pressure sensor disclosed in Japanese Unexamined Patent Application Publication No. 2001-2%1%, a water repellent filter is exemplified as a filter. Since the water repellent filter is exposed to the outside, it may not be possible to prevent clogging due to water or dust that cannot be fully repelled. Further, in this pressure sensor, the shape of the passage related to the opening to the atmosphere is complicated in the interior, and a simpler structure is desired.

It is an object of the disclosure to provide a pressure sensor that prevents the clogging of a filter provided at a portion maintaining the atmospheric pressure, with a simple structure.

A pressure sensor of an embodiment includes a pressure detector that detects a pressure of a detection target, a housing portion that includes a housing part housing the pressure detector, a concave portion facing the housing part across an inner wall, and a through hole part formed in the inner wall and allowing the housing part and the concave portion to communicate with each other, a filter that covers the through hole part, and a cover that is mounted on the housing portion while covering the concave portion and includes an atmospheric opening part, wherein the concave portion is formed with a bottom surface that is one surface of the inner wall, and two side surfaces that are perpendicular to the bottom surface and are opposed to each other, the cover is formed with an upper plate having a rectangular shape and two side plates having a rectangular shape that are continuous with edges of the upper plate in a vertical direction and are opposed to each other, the upper plate is arranged to face the bottom surface of the concave portion, and the two side plates are arranged between the two side surfaces of the concave portion that are opposed to each other.

DETAILED DESCRIPTION

Figure 1:
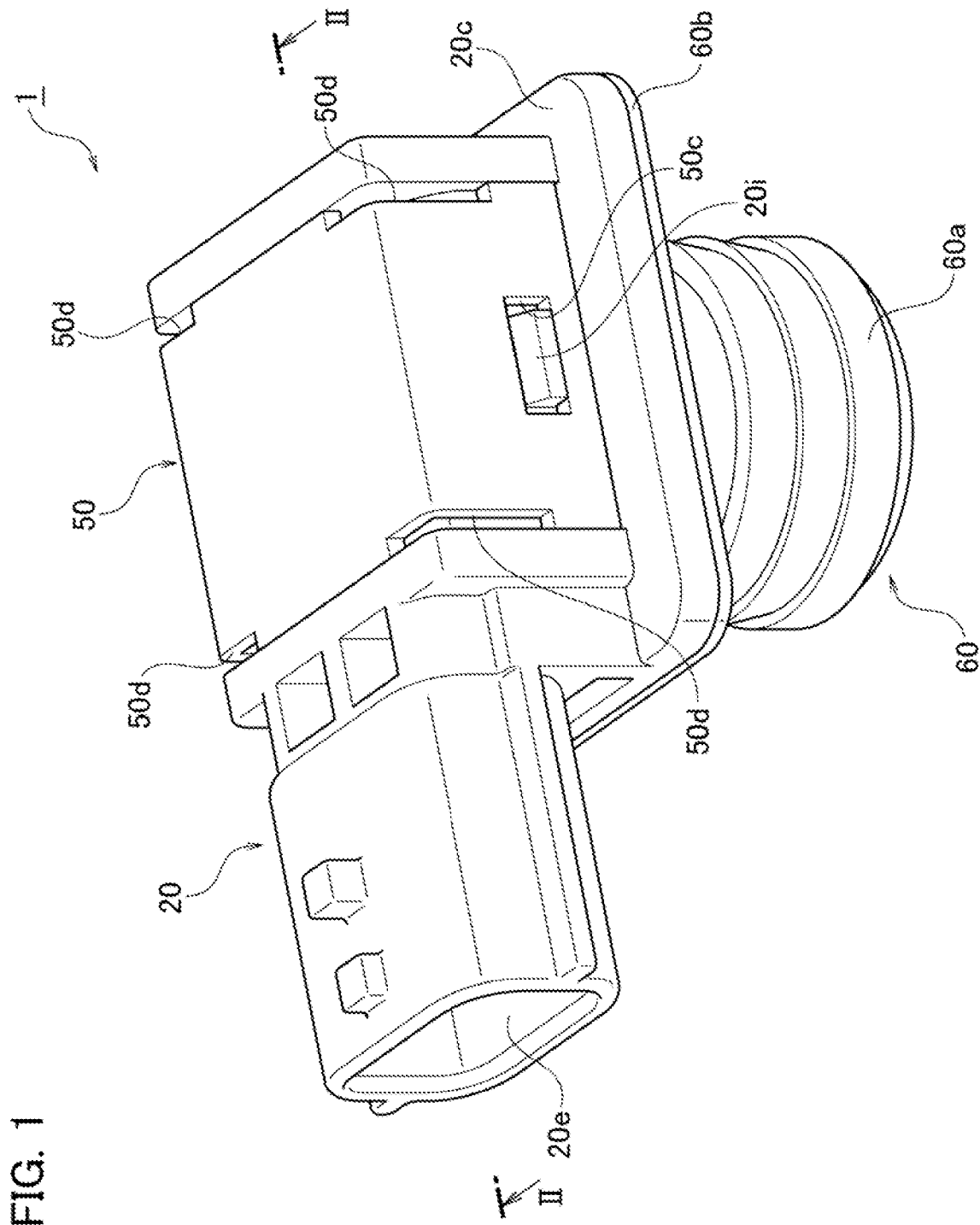
FIG. 1 is a perspective view of a pressure sensor according to a first embodiment.

Various embodiments will be described hereinafter with reference to the accompanying drawings.

The pressure sensor according to each embodiment will be described in detail below with reference to the drawings. Note that dimension ratios in the drawings are exaggerated for convenience of explanation and are sometimes different from actual ratios.

First Embodiment

Figure 2:
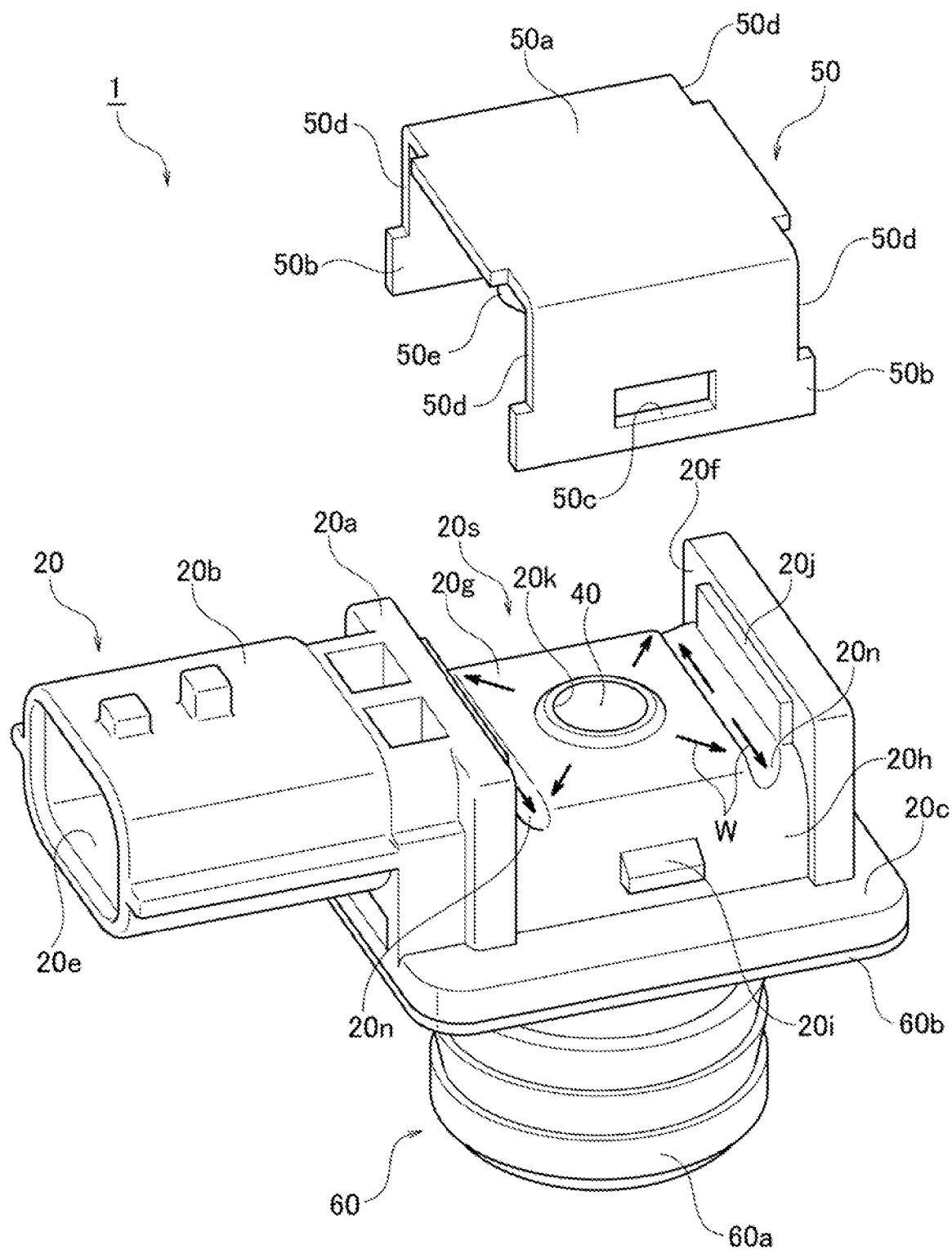
FIG. 2 is a perspective view of the pressure sensor before a cover is mounted thereon in the first embodiment.
Figure 3:
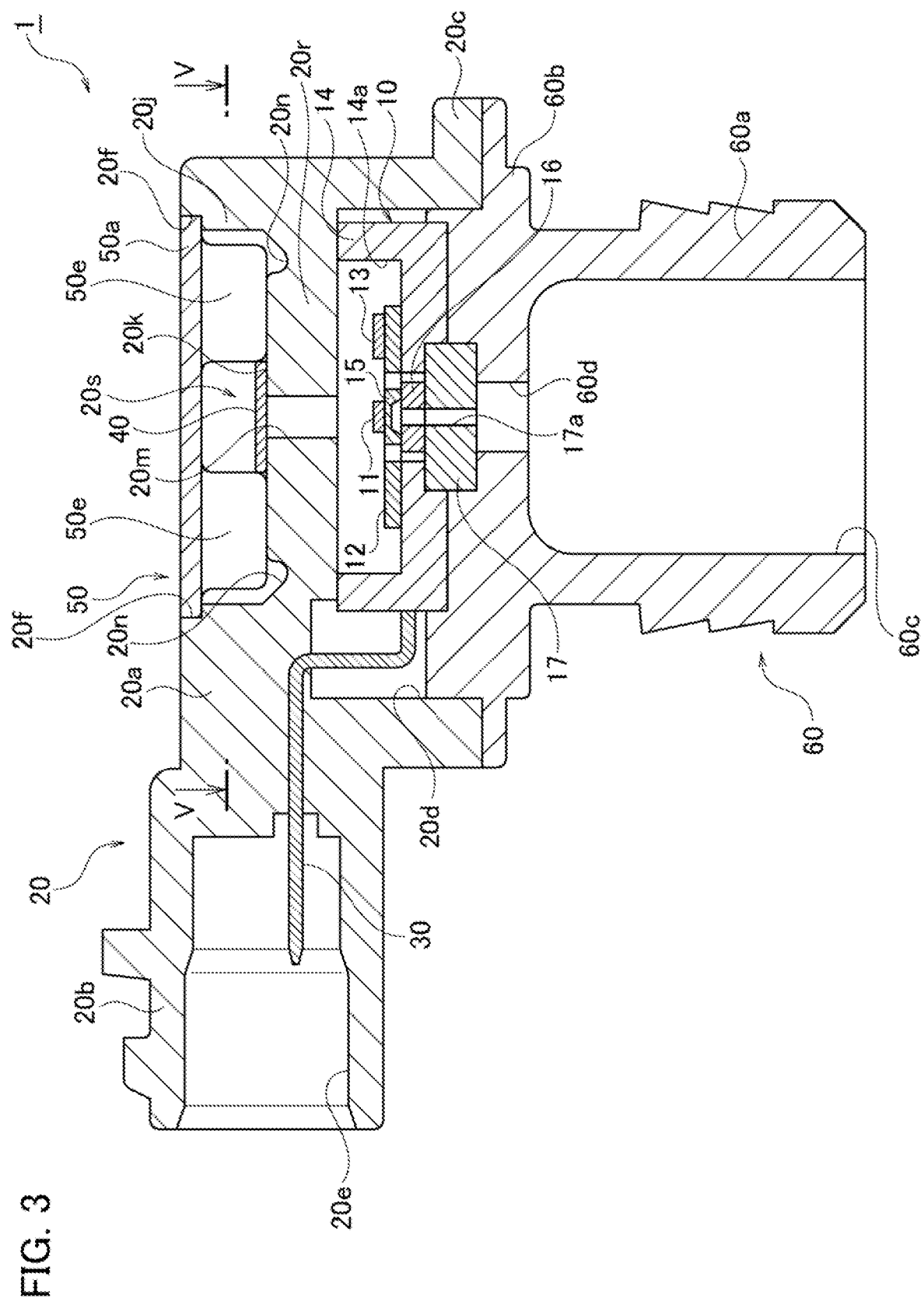
FIG. 3 is a cross-sectional view of the pressure sensor according to the first embodiment.

FIG. 1 is a perspective view of a pressure sensor 1 according to a first embodiment. FIG. 2 is a perspective view of the pressure sensor 1 before a cover 50 is mounted thereon. FIG. 3 is a cross-sectional view of the pressure sensor 1 taken along the line II-II of FIG. 1.

The pressure sensor 1 is a gauge pressure type for measuring a pressure of a detection target based on the atmospheric pressure. In the present embodiment, as an example, the pressure sensor 1 detects the intake pressure (negative pressure) of an engine serving as a booster, with respect to a brake booster serving as an auxiliary device for reducing the operating force of a brake provided in a vehicle such as an automobile. The pressure sensor 1 includes a pressure sensor module 10, a housing portion 20, a terminal portion 30, a filter 40, a cover 50, and a mounting portion 60.

The pressure sensor module 10 is a pressure detector that detects a pressure of a detection target. The pressure sensor module 10 includes a pressure sensor element 11, a wiring board 12, a signal processing circuit 13, and a unit case 14. The pressure sensor element 11 is a sensor unit used to detect a pressure of a detection target. The pressure range of the pressure sensor element 11 is, for example, 10 to 120 kPa. Note that the pressure sensor element 11 can be appropriately changed depending on the type of detection target, use conditions, or the like. The wiring board 12 is, for example, a printed circuit board, on which the pressure sensor element 11, the signal processing circuit 13, and the like are mounted. The signal processing circuit 13 is an IC chip that performs predetermined processing and the like on a sensor signal output from the pressure sensor element 11. The signal processing circuit 13 is electrically connected to the terminal portion 30. The unit case 14 is a resin unit body having a housing space portion 14a for housing the pressure sensor element 11, the wiring board 12, and the signal processing circuit 13.

The pressure sensor module 10 may include a diaphragm 15, a glass pedestal 16, and a stem 17. The diaphragm 15 transmits a pressure change in the detection target as a deformation force to the pressure sensor element 11. The glass pedestal 16 in a tubular shape supports the diaphragm 15. The stem 17 is an intermediate member that supports the glass pedestal 16 and is interposed for connecting the pressure sensor module 10 and the mounting portion 60. The stem 17 includes a hole 17a passing therethrough along the central axis. Air sucked from the outside toward the inside of the engine reaches the diaphragm 15 through the hole 17a from near the mounting portion 60.

Further, the pressure sensor module 10 is manufactured in advance as one unit. For example, multiple pressure sensor modules 10 having different pressure ranges are prepared in advance, and thus when assembling the pressure sensor 1, the worker can select a pressure sensor module 10 having an appropriate pressure range and start the work quickly.

The housing portion 20 is formed from a resin material such as PPS resin and serves as apart of the exterior of the pressure sensor 1. The housing portion 20 includes a housing body 20a, a connector part 20b, and a connection part 20c, which are continuous with each other as one body.

The housing body 20a includes a housing part 20d and a concave portion 20s. The housing part 20d and the concave portion 20s face each other across an inner wall 20r. The inner wall 20r is a flat plate portion perpendicular to the direction in which the mounting portion 60 is connected to the housing portion 20.

The housing pan 20d includes one end to which the mounting portion 60 is connected as an open portion, and houses the pressure sensor module 10.

The concave portion 20s includes an open portion opposite to where the mounting portion 60 is connected, and in combination with the cover 50, makes the inside a space portion for atmospheric opening. Specifically, the concave portion 20s is formed by a bottom surface 20g, which is one surface of the inner wall 20r, and two side surfaces 20f, which are perpendicular to the bottom surface 20g and are opposed to each other. The planar shape of the bottom surface 20g is approximately rectangular. Here, the shape of the concave portion 20s has no side surfaces that are perpendicular to the bottom surface 20g and perpendicular to the direction in which the two side surfaces 20f are opposed to each other.

Each of the side surfaces 20f may be provided with a support part 20j for supporting a part of the back surface of the cover 50 when the cover 50 is mounted on the housing portion 20. Each of the support parts 20j faces the cover 50 in the direction in which the cover 50 is mounted, and thus deformation of the cover 50 to the inside of the concave portion 20s is prevented, for example, when the cover 50 receives an impact from the outside.

The housing body 20a includes two side walls 20h whose surfaces are continuous with the bottom surface 20g of the concave portion 20s and are positioned at the sides of the housing part 20d. Each of the side walls 20h includes a projecting part 20i projecting outward. Each of the projecting parts 20i engages with an engagement hole 50c provided in the cover 50 when the cover 50 is mounted on the housing portion 20.

The end part of each of the support parts 20j facing the cover 50 and each of the side walls 20h may be recessed to the inside of the housing body 20a by an amount corresponding to the thickness of the cover 50 with respect to the entire outer surface of the housing body 20a. With the above-described shape, when the cover 50 is mounted on the housing portion 20, the height positions of the housing body 20a and the cover 50 are matched to each other, and the entire outer surface of the housing portion 20 becomes uniform, which is advantageous in terms of ease of handling due to the simple shape or in terms of appearance.

The inner wall 20r includes a through hole part 20m that allows the housing part 20d and the concave portion 20s to communicate with each other. One opening of the through hole part 20m is positioned at the approximate center of the bottom surface 20g of the concave portion 20s. The inner wall 20r includes an open edge 20k for providing the filter 40 to close the opening of the through hole part 20m at the center of the bottom surface 20g of the concave portion 20s.

The inner wall 20r includes two first groove parts 20n on the bottom surface 20g of the concave portion 20s along the side surfaces 20f of the concave portion 20s with the open edge 20k therebetween, the open edge 20k being the provision position of the filter 40. Specifically, as illustrated in FIG. 2, one of the first groove parts 20n is provided in a linear shape in the vicinity of one of the side surfaces 20f along the one side surface 20f. In a similar manner, the other of the first groove parts 20n is provided in a linear shape in the vicinity of the other of the side surfaces 20f along the other side surface 20f. One end of each of the first groove parts 20n is continuous with one of the side walls 20h, and the other end is continuous with the other of the side walls 20h.

The connector pan 20b connects with an external connector of an external wiring member such as a wire harness routed in a vehicle. In the present embodiment, the connector part 20b is continuous to the housing body 20a in a direction perpendicular to the direction in which the mounting portion 60 is connected to the housing portion 20. The connector part 20b includes an open part 20e having one end that is open to the outside and exposing a part of the terminal portion 30.

The connection part 20c is formed in a flange shape and connects with the mounting portion 60. The connection part 20c is connected to a housing connection part 60b of the mounting portion 60 by being adhered thereto, for example.

The terminal portion 30 includes multiple terminals that are metal rods for electrically connecting the pressure sensor module 10 and the external wiring of the external connector. The terminal portion 30 may include, for example, multiple terminals such as power supply terminals, signal terminals, or ground terminals.

The filter 40 is a water-repellent filter in a disk sheet shape, which makes it difficult for moisture, dust, and the like to pass therethrough, while allowing air to pass. For example, the filter 40 may be fluorine resin formed in a porous state, to which a water repellent treatment is applied. The filter 40 is provided on the open edge 20k arranged at the center on the bottom surface 20g of the concave portion 20s of the inner wall 20r. Here, the filter 40 may be fixed to the open edge 20k with welding, for example. Thus, one opening of the through hole part 20m facing the concave portion 20s is closed by the filter 40.

The cover 50 is a member formed from a resin material such as PPS resin and is mounted on the housing portion 20 while covering the concave portion 20s. The cover 50 is formed with an upper plate 50a in a rectangular shape and two side plates 50b in a rectangular shape. The side plates 50b are continuous from the edges of the upper plate 50a in the vertical direction and thus are opposed to each other. When the cover 50 is mounted on the housing portion 20, the upper plate 50a is arranged to face the bottom surface 20g of the concave portion 20s. In contrast, the side plates 50b are arranged between the two opposed side surfaces 20f of the concave portion 20s. When the cover 50 is mounted on the housing portion 20, a part of one side plate 50b faces one side wall 20h, and a part of the other side plate 50b faces the other side wall 20h. Each side plate 50b includes the engagement hole 50c that engages with the projecting part 20i formed on the side wall 20h at a part facing the side wall 20h.

Figure 4:
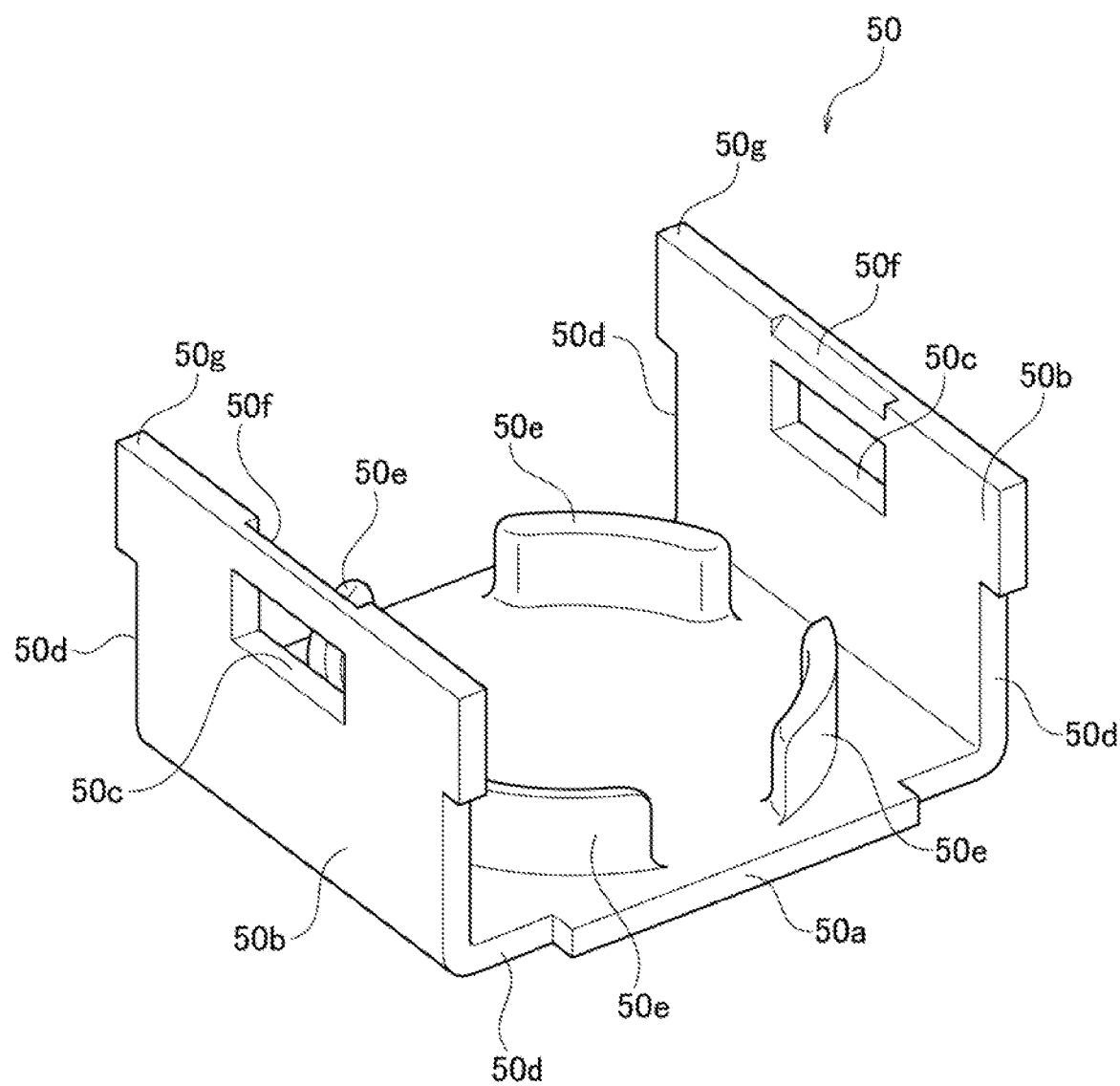
FIG. 4 is a perspective view of the cover as seen from the rear surface side in the first embodiment.

FIG. 4 is a perspective view of the cover 50 as seen from the rear surface side. The cover 50 includes an atmospheric opening part for opening a space portion formed between the cover 50 and the concave portion 20s to the atmosphere outside of the pressure sensor 1. The atmospheric opening part in the present embodiment includes four cutout parts 50d, each formed in the cover 50 to be continuous from a corner part of the upper plate 50a to a corner part of one of the side plates 50b. Note that in the present embodiment, the total of four cutout parts 50d in one-to-one correspondence to the four corners of the upper plate 50a are formed, but for example, multiple cutout parts 50d corresponding to only some of the four corners of the upper plate 50a may be formed.

The cover 50 includes multiple ribs 50e on the back surface of the upper plate 50a. Here, the back surface of the upper plate 50a corresponds to a surface facing the bottom surface 20g of the concave portion 20s when the cover 50 is mounted on the housing portion 20. The ribs 50e are shaped such that when the cover 50 is mounted on the housing portion 20, they each project toward the bottom surface 20g at the outer periphery side of the filter 40 and partially face in a direction in which a corresponding cutout part 50d is formed. The tip of each rib 50e may be in contact with the bottom surface 20g when the cover 50 is mounted on the housing portion 20. In the present embodiment, the four ribs 50e are provided in one-to-one correspondence to the four cutout parts 50d. The four ribs 50e are provided at equal intervals along a circumference of a diameter larger than the outer diameter of the filter 40 to correspond to the respective cutout parts 50d, and are formed of curved wall portions not in contact with each other (see FIG. 5).

Note that as illustrated in FIG. 4, a chamfered part 50f may be formed at the open edge 50g of each side plate 50b of the cover 50, which is positioned opposite to the edge of the side plate 50b continuous with the edge of the upper plate 50a. Provision of the chamfered parts 50f facilitates, for example, engagement of the engagement holes 50c with the projecting parts 20i when a worker mounts the cover 50 to the housing portion 20.

The mounting portion 60 is formed from a resin material such as PPS resin and serves as a part of the exterior of the pressure sensor 1 together with the housing portion 20. The mounting portion 60 includes a mounting tube part 60a and a housing connection part 60b, which are continuous with each other as one body.

The mounting tube part 60a is connected to a mounting hole of a mounted member on which the pressure sensor 1 is mounted. The mounting tube part 60a includes on the inner peripheral side a first introduction hole 60c having one end open to the outside. For example, when the pressure sensor 1 is mounted on the mounted member, the first introduction hole 6k is open into a flow path through which air sucked toward the inside of the engine flows.

The housing connection part 60b is formed in a flange shape and is connected to the connection part 20c of the housing portion 20. The housing connection part 60b includes a second introduction hole 60d having a diameter smaller than that of the first introduction hole 60c. One end of the second introduction hole 60d communicates with the first introduction hole 60c. The other end of the second introduction hole 60d is open to the housing part 20d of the housing portion 20. The housing connection part 60b tightly holds the pressure sensor module 10 on the housing part 20d side. The second introduction hole 60d supports a part of the stem 17 of the pressure sensor module 10 and communicates with the hole 17a of the stem 17.

Next, the operation of the pressure sensor 1 will be described.

First, in the pressure sensor 1, one side of the pressure sensor element 11 is open to the atmosphere through the cutout parts 50d, which serves as the atmospheric opening part provided with the cover 50, the concave portion 20s, the through hole pan 20m, and the housing part 20d. Then, the pressure sensor element 11 detects the pressure of a detection target reaching the diaphragm 15 through the first introduction hole 60c and the second introduction hole 60d of the mounting portion 60 and the hole 17a of the stem 17.

Here, in the present embodiment, since the filter 40 is provided according to the position of the through hole pan 20m on the passage for the atmospheric opening, the entry of moisture, dust, and the like contained in the atmosphere toward the pressure sensor module 10 is approximately prevented. Further, in the present embodiment, since the filter 40 is not directly exposed to the outside and is arranged inside the space portion surrounded by the cover 50 and the concave portion 20s, moisture, dust, and the like contained in the atmosphere are less likely to reach the filter 40.

Figure 5:
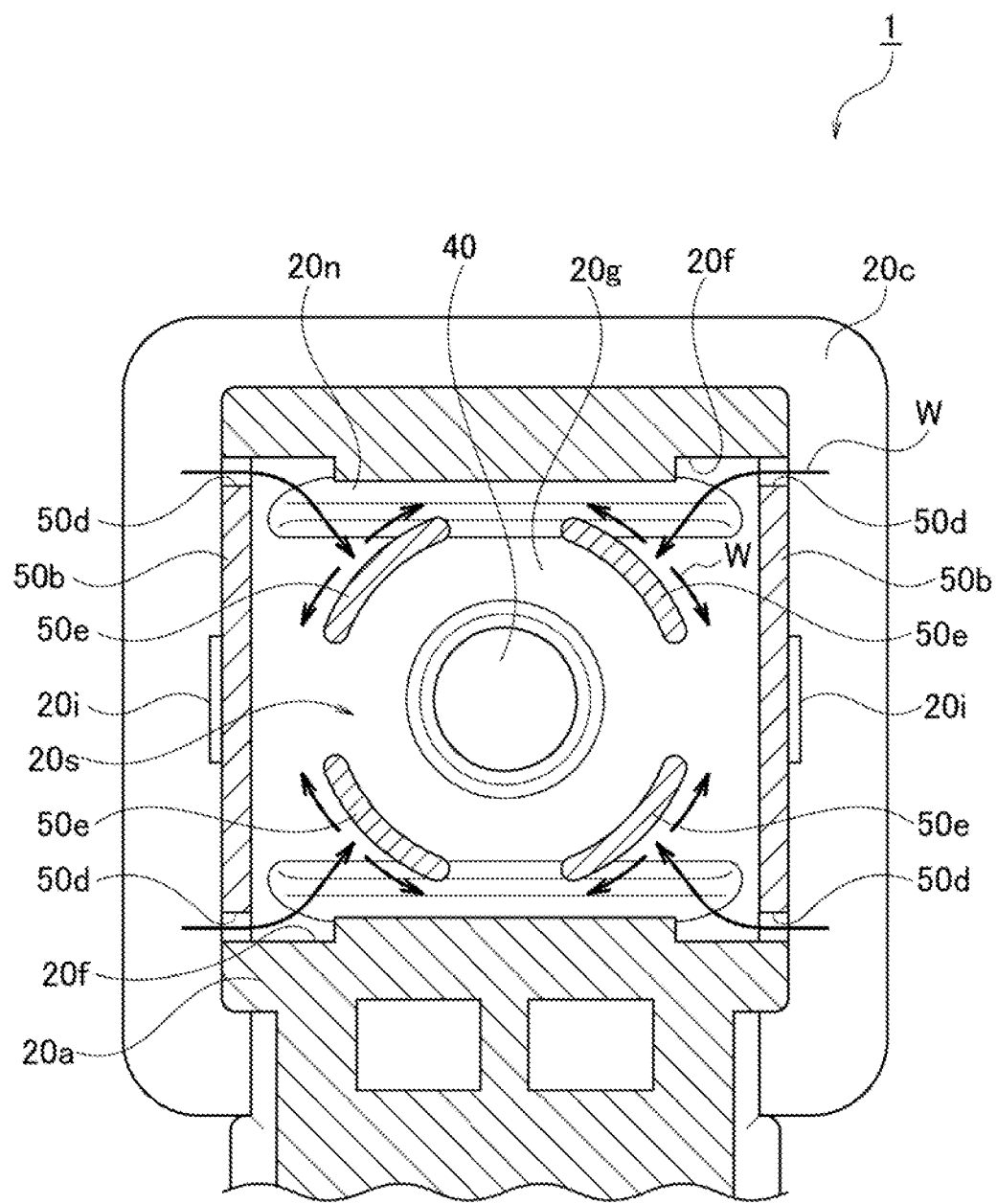
FIG. 5 is a cross-sectional view for explaining a water-blocking action on a filter in the first embodiment.

In the present embodiment, the multiple ribs 50e provided on the cover 50 act to prevent the filter 40 from being wet. FIG. 5 is a cross-sectional view along the line V-V of FIG. 3 for illustrating the water-blocking action on the filter 40. In the space portion surrounded by the cover 50 and the concave portion 20s, the ribs 50e are arranged between the cutout parts 50d and the filter 40. Thus, even if moisture and the like W enters the space portion surrounded by the cover 50 and the concave portion 20s from the outside through the cutout parts 50d, as indicated by arrows in FIG. 5, the moisture and the like W is blocked by the cutout parts 50d and cannot directly go to the filter 40. That is, the moisture and the like W entering from the cutout parts 50d hardly adheres to the filter 40. Note that since the ribs 50e adjacent to each other are not in contact with each other, the ribs 50e do not block the atmospheric opening through the filter 40.

Further, in the present embodiment, the two first groove pans 20n provided on the inner wall 20r and facing the concave portion 20s act to discharge to the outside the moisture and the like W that has entered the space portion surrounded by the cover 50 and the concave portion 20s. Even if the moisture and the like W enters the space portion surrounded by the cover 50 and the concave portion 20s from the outside through the cutout parts 50d, the moisture and the like W goes to the first groove parts 20n as illustrated by arrows in FIG. 2. Since both ends of each of the first groove parts 20n are continuous with the side walls 20h, the moisture and the like W flows on the surfaces of the side walls 20h and is subsequently discharged to the outside from the minute space between the side walls 20h and the cover 50.

Next, the effect of the pressure sensor 1 will be described.

The pressure sensor 1 according to the present embodiment includes a pressure detector (pressure sensor module 10) that detects a pressure of a detection target. The pressure sensor 1 includes the housing portion 20 that includes the housing part 20 housing the pressure detector, the concave portion 20s facing the housing part 20d across the inner wall 20r, and the through hole part 20m formed in the inner wall 20r and allowing the housing part 20d and the concave portion 20s to communicate with each other. The pressure sensor 1 includes the filter 40 that closes the through hole part 20m, and the cover 50 that is mounted on the housing portion 20 while covering the concave portion 20s and includes the atmospheric opening part. The concave portion 20s is formed with the bottom surface 20g, which is one surface of the inner wall 20r, and the two side surfaces 20f that are perpendicular to the bottom surface 20g and are opposed to each other. The cover 50 is formed with the upper plate 50a, and the two side plates 50b that are continuous from both edges of the upper plate 50a in the vertical direction and are opposed to each other. The upper plate 50a is arranged to face the bottom surface 20g of the concave portion 20s. The side plates 50b are arranged between the two opposed side surfaces 20f of the concave portion 20s.

First, in the pressure sensor 1, since the filter 40 is provided according to the position of the through hole part 20m serving as the passage for the atmospheric opening, the entry of moisture, dust, and the like contained in the atmosphere toward the pressure sensor module 10 is approximately prevented. Further, in the pressure sensor 1, since the filter 40 is arranged inside the space portion surrounded by the cover 50 and the concave portion 20s, moisture, dust, and the like contained in the atmosphere are less likely to reach the filter 40 than when a filter is directly exposed to the outside. Thus, the pressure sensor 1 is likely to prevent clogging of the filter 40 due to the moisture, dust, and the like contained in the atmosphere.

In the pressure sensor 1, the space portion provided for not to directly exposing the filter 40 to the outside is formed with the cover 50 formed only of the upper plate 50a and the two side plates 50b, and the concave portion 20s of the housing portion 20 made to fit to the shape of the cover 50. The atmospheric opening part that makes the space portion surrounded by the cover 50 and the concave portion 20s open to the atmosphere is provided in the cover 50. This enables the structure of the pressure sensor 1 as a whole to be simplified because it is not necessary to separately configure a flow path, a hole, and the like functioning as the atmospheric opening part in the housing portion 20 while avoiding the complicated shape of the cover 50.

As described above, according to the present embodiment, it is possible to provide the pressure sensor 1 that prevents, with a simple structure, the clogging of the filter 40 provided at a portion maintaining the atmospheric pressure.

In the pressure sensor 1 according to the present embodiment, the housing portion 20 may include the two side walls 20h, whose surfaces are positioned at the sides of the housing part 20d and are continuous with the bottom surface 20g of the concave portion 20s, the two side walls 20h including the projecting parts 20i projecting outward. A part of each of the side plates 50b of the cover 50 may have the engagement hole 50c facing one of the two side walls 20h and engaged with one of the projecting parts 20i.

In the pressure sensor 1, for example, when a worker assembles the pressure sensor 1, it is possible for the cover 50 to be mounted on the housing portion 20 with one touch, which is advantageous in terms of improving the ease of assembly.

In the pressure sensor 1 according to the present embodiment, the atmospheric opening part may be constituted by the multiple cutout parts 50d, each formed in the cover 50 to be continuous from a corner pan of the upper plate 50a to a corner part of one of the side plates 50b.

In the pressure sensor 1, the space portion surrounded by the cover 50 and the concave portion 20s is open to the atmosphere through the end parts of the space portion, and thus even if moisture, dust, and the like enters the space portion, it is possible to make it difficult for the moisture, dust, and the like to reach the filter 40. Consequently, it is possible to prevent the clogging of the filter 40 with more ease.

In the pressure sensor 1 according to the present embodiment, the filter 40 may be provided at the center of the bottom surface 20g of the concave portion 20s of the inner wall 20r. The inner wall 20r may include the two first groove parts 20n, each having one end continuous with one side wall 20h and the other end continuous with the other side wall 20h, on the bottom surface 20g of the concave portion 20s along the side surfaces 20f of the concave portion 20s with the filter 40 provided therebetween.

In the pressure sensor 1, as described above as a drainage action, even if moisture and the like W enters the space portion surrounded by the cover 50 and the concave portion 20s through the cutout parts 50d, it is possible to discharge with ease the moisture and the like W to the outside through the first groove parts 20n. Consequently, it is possible to prevent the clogging of the filter 40 with more ease.

In the pressure sensor 1 according to the present embodiment, the cover 50 may include the ribs 50e on the surface facing the bottom surface 20g of the concave portion 20s. The ribs 50e each project toward the bottom surface 20g at the outer periphery side of the filter 40 and partially face in a direction in which a corresponding cutout part 50d is formed.

In the pressure sensor 1, as described above as a water-blocking action, even if moisture and the like W enters the space portion surrounded by the cover 50 and the concave portion 20s through the cutout parts 50d, it is possible to make it difficult for the moisture and the like W to adhere to the filter 40. Consequently, it is possible to prevent the clogging of the filter 40 with more ease.

Second Embodiment

In the first embodiment, the cutout parts 50d are exemplified as the atmospheric opening part included in the cover 50. In contrast, in the present embodiment, an example in which the shape of the cover is further simplified will be described.

Figure 6:
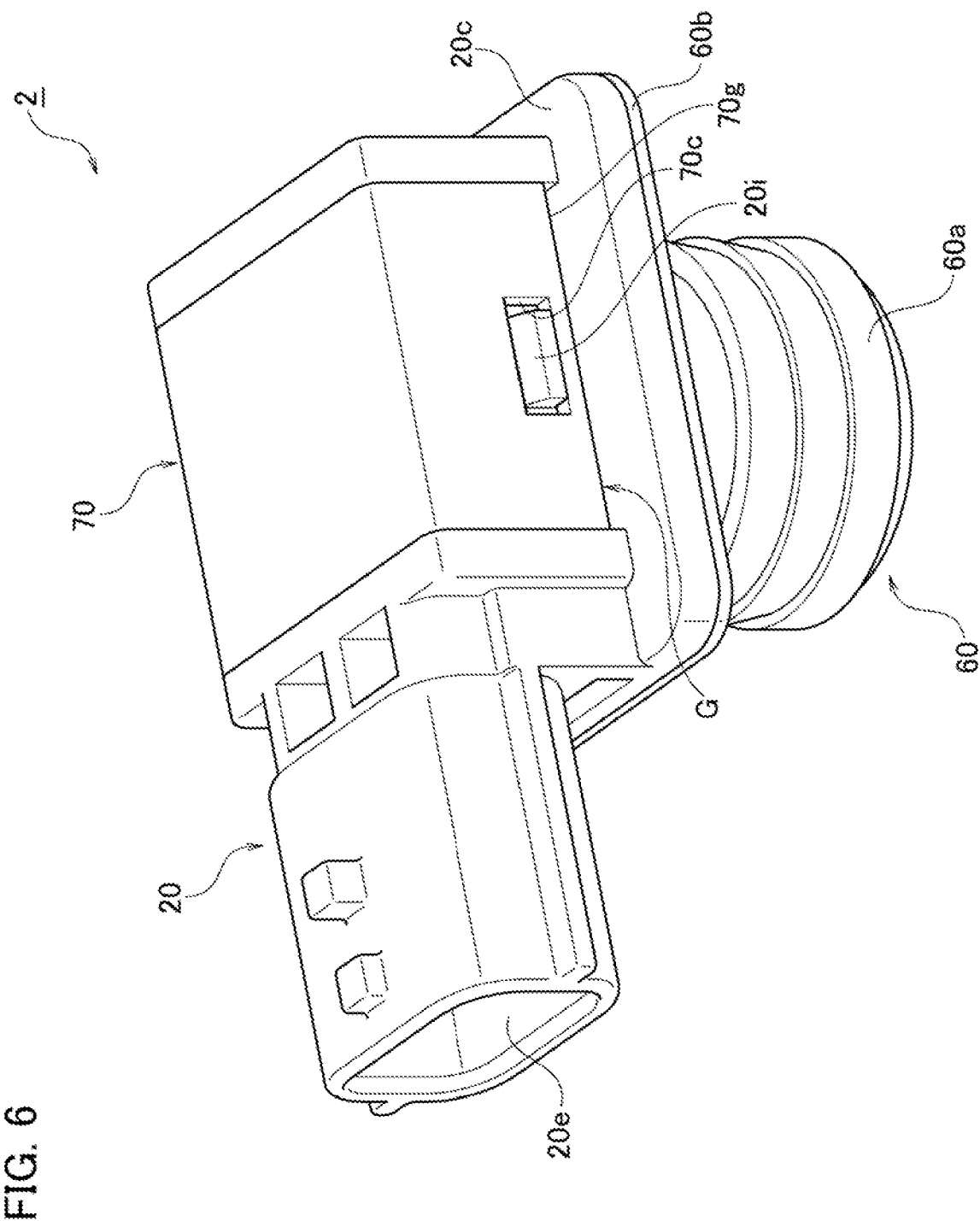
FIG. 6 is a perspective view of a pressure sensor according to a second embodiment.
Figure 7:
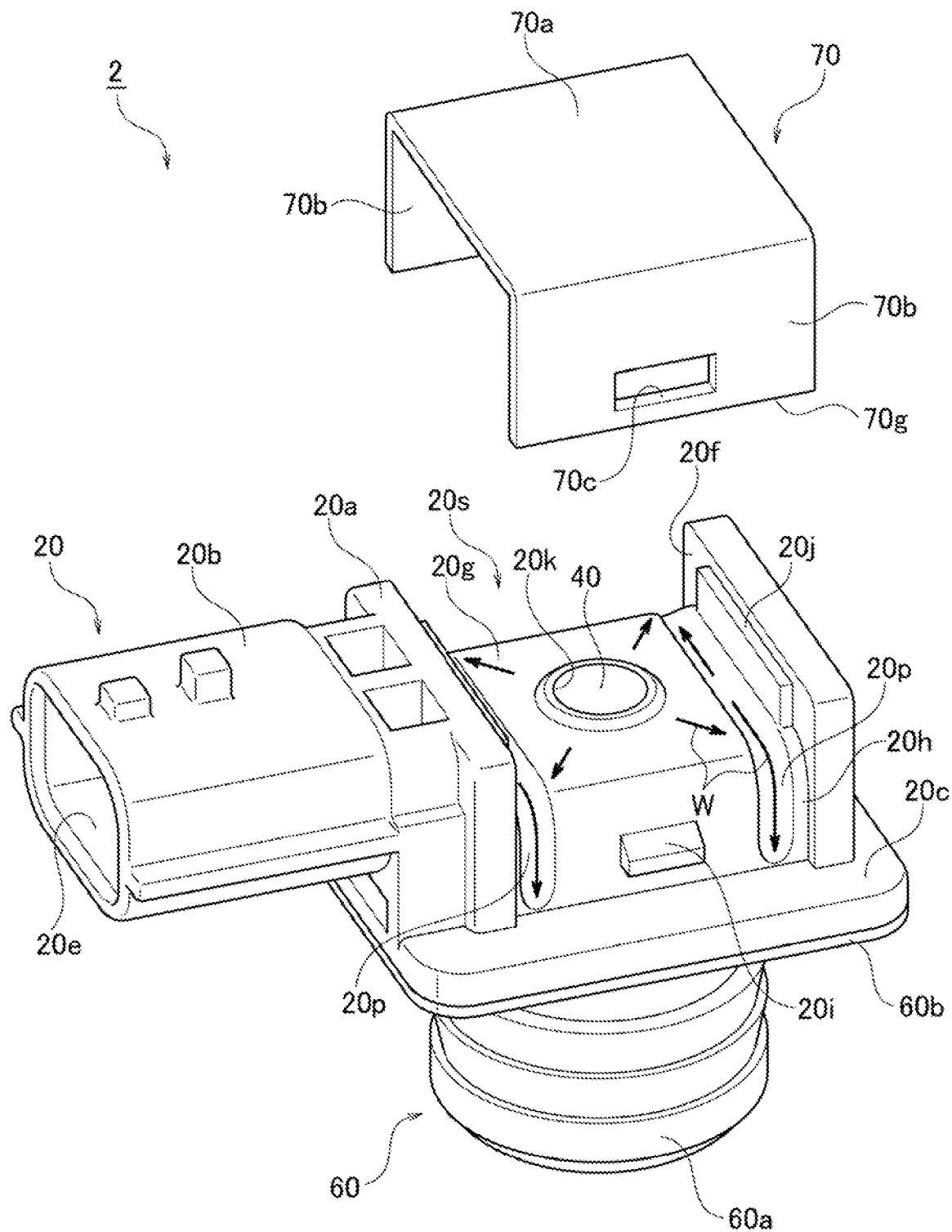
FIG. 7 is a perspective view of the pressure sensor before a cover is mounted thereon in the second embodiment.
Figure 8:
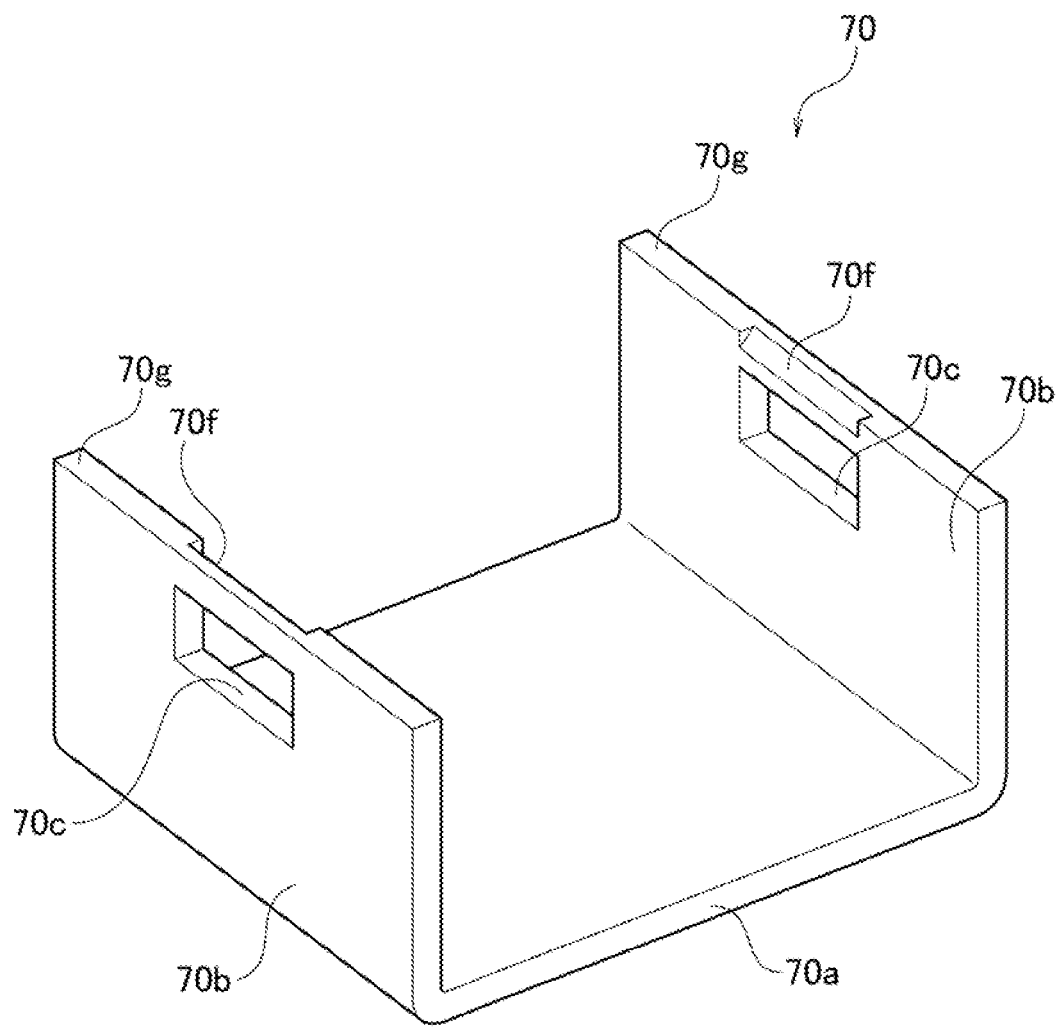
FIG. 8 is a perspective view of the cover as seen from the rear surface side in the second embodiment.

FIG. 6 is a perspective view of a pressure sensor 2 according to the second embodiment. FIG. 7 is a perspective view of the pressure sensor 2 before a cover 70 is mounted thereon. FIG. 8 is a perspective view of the cover 70 as seen from the rear surface side. Here, FIG. 6 corresponds to FIG. 1 of the first embodiment. FIG. 7 corresponds to FIG. 2 of the first embodiment. FIG. 8 corresponds to FIG. 4 of the first embodiment. Regarding the pressure sensor 2, components having the same configuration as the pressure sensor 1 according to the first embodiment are denoted by the same reference numerals, and the description thereof will be omitted below.

Similar to the cover 50 in the first embodiment, the cover 70 includes an upper plate 70a, two side plates 70b, two engaging holes 70c, and two chamfered pans 70f. However, the cover 70 does not include the cutout parts 50d and the ribs 50e provided on the cover 50.

As an alternative configuration in which the cover 70 does not include the cutout parts 50d and the ribs 50e, first, the atmospheric opening part in the present embodiment is constituted by open edges 70g of the side plates 70b, each of the open edges 70g is positioned opposite to the edge of the side plate 70b continuous with one of the edges of the upper plate 70a. Here, the height of each of the side plates 70b is shorter than the height of each of the side plates 50b in the first embodiment. Consequently, as illustrated in FIG. 6, when the cover 70 is mounted on the housing portion 20, a gap G is formed between each of the open edges 70g and the connection portion 20c.

Meanwhile, in the housing portion 20 in the present embodiment, the inner wall 20r and the side walls 20h include two second groove parts 20p instead of the two first groove parts 20n in the first embodiment. The two second groove parts 20p are formed to be continuous from the bottom surface 20g of the concave portion 20s to the surfaces of the side walls 20h along the side surfaces 20f of the concave portion 20s with the filter 40 provided therebetween.

In the pressure sensor 2 having such a configuration, a space portion surrounded by the cover 70 and the concave portion 20s is open to the atmosphere through the gap G. Here, a part of the second groove part 20p continuous from the gap G to the bottom surface 20g exists in a region between the each of the side walls 20h and each of the side plates 70b of the cover 70. Thus, it is possible for the second groove parts 20p to act as a flow path for opening to the atmosphere in addition to the drainage action in a similar manner in the first embodiment.

Here, since the open edges 70g of the cover 70 serves as the atmospheric opening part, it is practically difficult for moisture and the like from the outside to directly adhere to the filter 40. Thus, the cover 70 need not be provided with parts like the ribs 50e of the cover 50 in the first embodiment.

As described above, in the pressure sensor 2 according to the present embodiment, first, the atmospheric opening part may be constituted by the open edges 70g of the side plates 70b, each of the open edges 70g is positioned opposite to the side continuous with one of the edges of the upper plate 70a.

In the pressure sensor 2, it is possible to make the shape of the cover 70 simpler than that of the cover 50 in the first embodiment.

In the pressure sensor 2 according to the present embodiment, the inner wall 20r and the side walls 20h may be continuous on the bottom surface 20g of the concave portion 20s and the surfaces of the side walls 20h and may include the two second groove parts 20p along the side surfaces 20f of the concave portion 20s with the filter 40 provided therebetween.

In the pressure sensor 2, the second groove parts 20p act as a flow path for promoting the opening to the atmosphere while acting to discharge water and the like W to the outside as in the first embodiment. Thus, even if the shape of the cover 70 is simplified, it is possible to prevent the clogging of the filter 40.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A pressure sensor, comprising:
  a pressure detector that detects a pressure of a detection target;
  a housing portion that includes a housing part housing the pressure detector, a concave portion facing the housing part across an inner wall, and a through hole part formed in the inner wall and allowing the housing part and the concave portion to communicate with each other;
  a filter that covers the through hole part; and
  a cover that is mounted on the housing portion while covering the concave portion and includes an atmospheric opening part, wherein
  the concave portion is formed with a bottom surface that is one surface of the inner wall, and two side surfaces that are perpendicular to the bottom surface and are opposed to each other,
  the cover is formed with an upper plate having a rectangular shape and two side plates having a rectangular shape that are continuous with edges of the upper plate in a vertical direction and are opposed to each other,
  the upper plate is arranged to face the bottom surface of the concave portion,
  the two side plates are arranged between the two side surfaces of the concave portion that are opposed to each other, and
  the atmospheric opening part includes a plurality of cutout parts, each formed in the cover to be continuous from a corner part of the upper plate to a corner part of the two side plates.

2. The pressure sensor according to claim 1, wherein
  the housing portion includes two side walls extending downwardly from the bottom surface away from the concave portion, the side walls having surfaces that are continuous with the bottom surface of the concaved portion and are positioned at sides of the housing part, the two side walls including projecting parts projecting outward, and
  a part of each of the two side plates of the cover faces one of the two side walls and includes an engagement hole part with which one of the projecting parts engages.

3. The pressure sensor according to claim 1, wherein
  the filter is provided at a center of the bottom surface of the concave portion in the inner wall, and
  the inner wall includes two first groove parts on the bottom surface side of the concave portion and along the side surfaces of the concave portion with the filter provided therebetween, one end of each of the two first groove parts is continuous with one of the side walls and the other end of each of the two first groove parts is continuous with the other of the side walls.

4. A pressure sensor, comprising:
  a pressure detector that detects a pressure of a detection target;
  a housing portion that includes a housing part housing the pressure detector, a concave portion facing the housing part across an inner wall, and a through hole part formed in the inner wall and allowing the housing part and the concave portion to communicate with each other;
  a filter that covers the through hole part; and
  a cover that is mounted on the housing portion while covering the concave portion and includes an atmospheric opening part, wherein the concave portion is formed with a bottom surface that is one surface of the inner wall, and two side surfaces that are perpendicular to the bottom surface and are opposed to each other, the cover is formed with an upper plate having a rectangular shape and two side plates having a rectangular shape that are continuous with edges of the upper plate in a vertical direction and are opposed to each other, the upper plate is arranged to face the bottom surface of the concave portion, the two side plates are arranged between the two side surfaces of the concave portion that are opposed to each other, the filter is provided at a center of the bottom surface of the concave portion in the inner wall, and the inner wall includes two first groove parts on the bottom surface side of the concave portion and along the side surfaces of the concave portion with the filter provided therebetween, one end of each of the two first groove parts is continuous with one of the side walls and the other end of each of the two first groove parts is continuous with the other of the side walls, and the cover includes multiple ribs on one surface that faces the bottom surface of the concave portion, the multiple ribs each protruding toward the bottom surface at an outer periphery side of the filter and partially facing toward a direction in which a corresponding cutout part of the cutout parts is formed.

\* \* \* \* \*